(12) United States Patent
Watanabe

(10) Patent No.: US 8,749,659 B2
(45) Date of Patent: Jun. 10, 2014

(54) IMAGE PROCESSING PROGRAM, IMAGE PROCESSING METHOD, IMAGE PROCESSING APPARATUS, AND IMAGE PICKUP APPARATUS

(75) Inventor: Takeshi Watanabe, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 108 days.

(21) Appl. No.: 13/591,419

(22) Filed: Aug. 22, 2012

(65) Prior Publication Data

US 2013/0050539 A1    Feb. 28, 2013

(30) Foreign Application Priority Data

Aug. 25, 2011  (JP) ................................ 2011-183247
Nov. 16, 2011  (JP) ................................ 2011-250310

(51) Int. Cl.
*H04N 5/228*    (2006.01)
*H04N 5/225*    (2006.01)
*G02B 13/16*    (2006.01)
*G06K 9/40*    (2006.01)

(52) U.S. Cl.
USPC ........ 348/222.1; 348/335; 382/254; 382/274; 382/275

(58) Field of Classification Search
USPC ........ 348/335–344, 222.1; 382/254, 274, 275
See application file for complete search history.

(56) References Cited

U.S. PATENT DOCUMENTS 5,294,976 A * 3/1994 Ohyama et al. ............ 348/229.1
5,450,128 A * 9/1995 Ohyama et al. ............ 348/229.1
6,418,243 B1 * 7/2002 Skoglund et al. ............ 382/274
7,115,849 B2 * 10/2006 Dowski et al. ............ 250/201.9
8,223,244 B2 * 7/2012 Ono ............................ 348/335
8,228,401 B2 * 7/2012 Ono ............................ 348/241
2010/0128050 A1 * 5/2010 Chou et al. .................... 345/589
2010/0328480 A1 * 12/2010 Kikuchi ..................... 348/222.1
2011/0122281 A1 * 5/2011 Ohara et al. ............... 348/222.1
2011/0149103 A1 * 6/2011 Hatakeyama et al. ..... 348/222.1
2011/0149140 A1 * 6/2011 Ono ............................ 348/336
2011/0157320 A1 * 6/2011 Oyama ......................... 348/49
2011/0187874 A1 * 8/2011 Kikuchi ..................... 348/207.1
2011/0193997 A1 * 8/2011 Hatakeyama ................ 348/241
2011/0199514 A1 * 8/2011 Tamura ........................ 348/234
2011/0205402 A1 * 8/2011 Kumar et al. ............... 348/240.3
2011/0292257 A1 * 12/2011 Hatakeyama ................ 348/242
2012/0070096 A1 * 3/2012 Oyama ......................... 382/254
2012/0099001 A1 * 4/2012 Oyama ......................... 348/234
2012/0140097 A1 * 6/2012 Morita et al. ................ 348/241
2012/0257278 A1 * 10/2012 Simonov et al. ............. 359/557
2012/0262596 A1 * 10/2012 Haas et al. ................. 348/222.1
2012/0307133 A1 * 12/2012 Gao et al. ..................... 348/349
2013/0015350 A1 * 1/2013 Chen et al. .................... 250/307

FOREIGN PATENT DOCUMENTS

JP          3840032 B      11/2006
JP       2011-022868 A      2/2011

* cited by examiner

*Primary Examiner* — Chia-Wei A Chen
(74) *Attorney, Agent, or Firm* — Rossi, Kimms & McDowell, LLP

(57) ABSTRACT

A non-transitory computer-readable storage medium stores a process for causing a computer to execute a method including the steps of acquiring optical transfer function information corresponding to an image pickup condition of a picked-up image (S102), generating a restoration image using correction optical transfer function information that is obtained by correcting the optical transfer function information using a correction value (S106-S108), and setting a settable range of the correction value based on an inverse characteristic of the optical transfer function information (S103, S104).

8 Claims, 7 Drawing Sheets

IMAGE PROCESSING PROGRAM, IMAGE PROCESSING METHOD, IMAGE PROCESSING APPARATUS, AND IMAGE PICKUP APPARATUS

BACKGROUND OF THE INVENTION

1. Field of the Invention

The present invention relates to an image processing of a picked-up image, and, in particular, relates to a technology that corrects a deterioration of the picked-up image due to an image pickup optical system with high accuracy.

2. Description of the Related Art

An object captured by an image pickup optical system has a minute extension because light generated from one point cannot be concentrated and has a minute extension, due to the influence of diffraction, aberration or the like, which are caused in the image pickup optical system. Such a distribution with minute extension is referred to as "PSF" (Point Spread Function). The picked-up image is formed as PSF is convoluted with an image because of the influence of the image pickup optical system, and the image blurs and the resolution is deteriorated.

Recently, it has become more common to hold the picked-up image as electronic data, and a technology to correct image deterioration due to an optical system by an image processing is well-known. Hereinafter, such image deterioration correction technology is referred to as "image restoration", and a traditional and general method will be described.

When, on a real space (x, y), an image before the deterioration due to the optical system is represented as f(x, y), PSF is represented as h(x, y), and a deteriorated image is represented as g(x, y), these can be described by the following expressions (1).

$$g(x, y) = \iint f(X, Y) * h(x-X, y-Y) dX dY \quad (1)$$

When the above expression (1) is converted from the real space (x, y) into a frequency space (u, v) by performing a Fourier transformation to the above expression (1), it can be described as the following expression (2).

$$G(u, v) = F(u, v) * H(u, v) \quad (2)$$

F(u, v) denotes a Fourier transform of f(x, y), G(u, v) denotes a Fourier transform of g(x, y), and H(u, v) denotes a Fourier transform of h(x, y).

Further, when the above expression (2) is transformed, the following expression (3) is derived.

$$F(u, v) = G(u, v) / H(u, v) \quad (3)$$

This denotes that F(u, V), which is a Fourier transform of f(x, y) being the image before the deterioration, can be obtained by dividing G(u, v), which is a Fourier transform of g(x, y) being the deteriorated image, by H(u, v), which is a Fourier transform of h(x, y) being the PSF. Accordingly, if an inverse Fourier transformation is performed on F(u, v), f(x, y) being the image before the deterioration can be obtained.

However, when such a processing is actually performed to obtain the image before the deterioration, a noise that may be caused by an image pickup element is greatly amplified and a good image cannot be obtained. In this case, it is known to use a Wiener filter which is represented as the following expression (4), as an image restoration method for suppressing the amplification of the noise. H(u, v) denotes OTF (Optical Transfer Function), and Γ denotes a constant for reducing the amplified amount of the noise.

$$W(u, v) = 1/H(u, v) * |H(u, v)|^2 / (|H(u, v)|^2 + \Gamma) \quad (4)$$

When the above expression (4) is multiplied to the Fourier transform G(u, v) of the deteriorated image g(x, y), a good image can be obtained with high resolution by setting to 0 a phase component of a PSF generated by the diffraction or the aberration of the optical system and by amplifying a frequency characteristic of an amplitude component. Therefore, when frequency space information of an image restored by an image restoration processing using the Wiener filter is defined as R(u, v), the following expression is obtained.

$$R(u, v) = G(u, v) * W(u, v) \quad (5)$$

As a result, a relationship of $|W(u, v)| \leq 1/|H(u, v)|$ can be derived from the expression (4). In other words, the maximum value of the frequency characteristic that is amplifiable using the image restoration filter is $1/|H(u, v)|$, and it equals to an inverse of an absolute value of OTF, that is to say, a characteristic of an inverse filter.

For example, when, for an image picked-up by a general camera or the like, the image restoration processing is performed by a processing using the Wiener filter of the expression (4), a correction value of the restoration processing can be controlled from 0 to $1/|H(u, v)|$ by controlling the value of Γ in the expression. Moreover, even if the Wiener filter is variously changed, the correction value of the restoration processing can be controlled with a range from 0 to $1/|H(u, v)|$. In this embodiment, the range from 0 to $1/|H(u, v)|$ is defined as a correctable range (hereinafter also referred to as "settable range").

When a computer where an image processing apparatus, an image pickup apparatus, or software is installed performs the processing using a correction value set by an instruction of a user, it is preferred to select or change a correction value according to a desired restoration level.

For example, Japanese Patent No. 3840032 discloses an invention that changes a range of a correction level of a correction value, such an edge emphasis, in a field of an image processing or the like. Moreover, Japanese Patent Laid-Open No. 2011-22868 discloses an invention that detects a restoration limit based on an image and a frequency characteristic of an image output device and performs an image restoration processing.

However, the prior arts disclosed in Japanese Patent No. 3840032 and Japanese Patent Laid-Open No. 2011-22868 do not describe a method for determining a concrete range of a level of the correction value in a system capable of combining various conditions. An image restoration processing used in digital cameras is greatly different from a general edge emphasis processing or a sharpness processing, and changes a correctable range with each combination of image pickup conditions, such an identification information of an image pickup optical system, a focal length, an F-number, an image pickup distance, an image height, and an pixel size of an image pickup element. Even if the image restoration processing is performed using a correction value beyond the correctable range, the user cannot experience the restoration effect.

Further, in another problem, when the correctable range is displayed on a display part, the maximum value of the correctable range when the restoration effect can be obtained is not displayed so that the user can recognize it, and therefore it is inconvenient when the correction value of the restoration processing is determined.

SUMMARY OF THE INVENTION

The present invention provides an image processing program capable of setting a proper correctable range according to a combination of various image pickup conditions.

A non-transitory computer-readable storage medium as one aspect of the present invention stores a process for causing a computer to execute a method including the steps of acquiring optical transfer function information corresponding to an image pickup condition of a picked-up image, generating a restoration image using correction optical transfer function information that is obtained by correcting the optical transfer function information using a correction value, and setting a settable range of the correction value based on an inverse characteristic of the optical transfer function information.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

[Embodiment 1]

Figure 1:
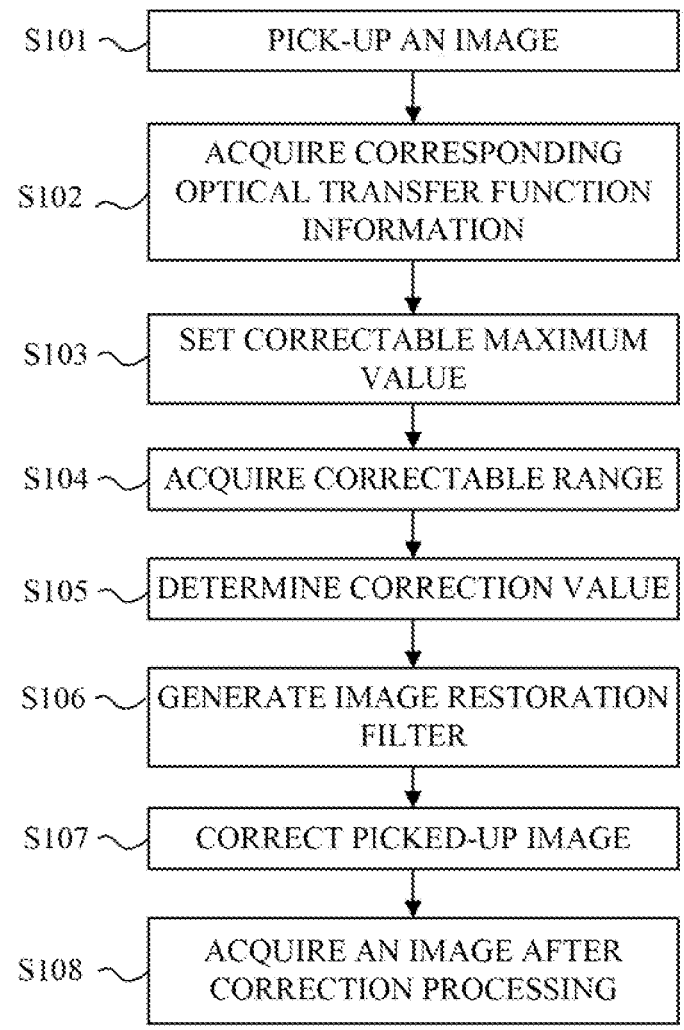
FIG. 1 is a diagram illustrating one example of a processing flow of an image restoration processing method in embodiment 1 as one example.

FIG. 1 is a diagram illustrating one example of a flow of an image processing in the present invention. First of all, an image of an object is picked-up by an image pickup apparatus, such a camera (S101), picked-up image data deteriorated by an optical system is input into an image processing apparatus, and an image restoration processing is started. The picked-up image data includes image pickup condition information, such identification information of an image pickup optical system, a focal length when the image is picked-up, an F-number, an image pickup distance, an image height, a pixel size of an image pickup element. Accordingly, first, the image pickup condition information added to the picked-up image data is acquired by the image processing apparatus. Second, OTF information (optical transfer function information), corresponding to each image height position of a picked-up image that includes a status corresponding to acquired image pickup condition information, is acquired from optical characteristic data held in an optical characteristic data memory in the inside of the image processing apparatus (S102). Next, based on the OTF information, the correctable maximum value of the image pickup condition when an image is picked-up is calculated and set (S103). The correctable maximum value may be determined in each image height position of the picked-up image, and may be determined from among all image height positions. The correctable maximum value set in S103 is smaller than a maximum value of a correctable range of a correction value before the setting of S103. The correctable maximum value or less is acquired as the correctable range (settable range) (S104), and a user determines the correction value within the correctable range (S105). Next, an image restoration filter is generated using correction optical transfer function information that is obtained by correcting the optical transfer function information using the determined correction value (S106), the picked-up image is corrected (S107), an image after the correction processing is obtained (S108). S106 to S108 can be referred to as a restoration image generation step of generating the restoration image. As the image restoration processing at this time, a well-known Wiener filter etc. can be used.

[Embodiment 2]

Figure 2A:
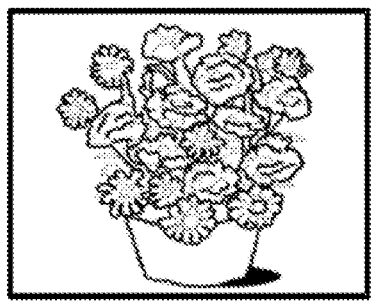
FIGS. 2A to 2D are diagrams illustrating one example of OTF data or the like which is used in an image restoration processing in embodiment 2.
Figure 2B:
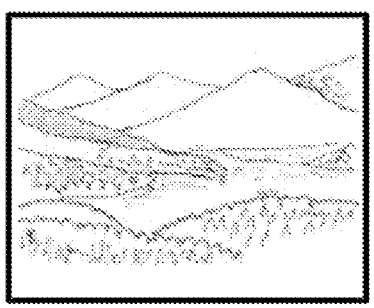
Figure 2C:
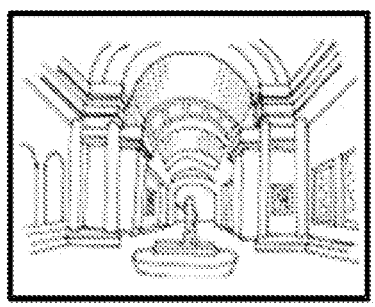
Figure 2D:
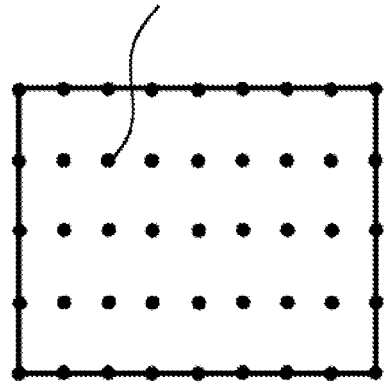
Figure 3:
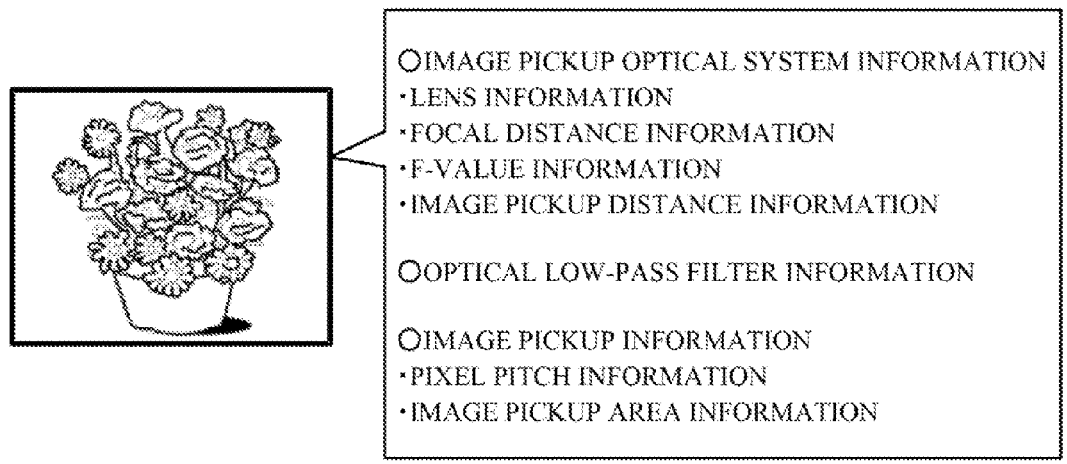
FIG. 3 is a diagram illustrating one example of various conditions used in the image restoration processing in embodiment 2.

The following describes a method of acquiring a correctable maximum value in an image restoration processing to determine a correctable range with reference to FIGS. 2A to 4E. Each FIGS. 2A, 2B and 2C illustrates an image picked-up in a different image pickup optical system or a different image pickup condition, such a focal length, an F-number, an image pickup distance, an image height, and a pixel size of image pickup element. The following describes FIG. 2A as the representative. Image-pickup optical system information, optical low pass filter information, and image pickup element information as illustrated in FIG. 3 are attached on the picked-up image of FIG. 2A. When this picked-up image is input into an image processing apparatus that performs the image restoration processing, OTF information at each image height point on the picked-up image is acquired based on the attached information, and a correctable maximum value is acquired based on the OTF information at each image height point.

Figures 4A, 4B, 4C, 4D, 4E:
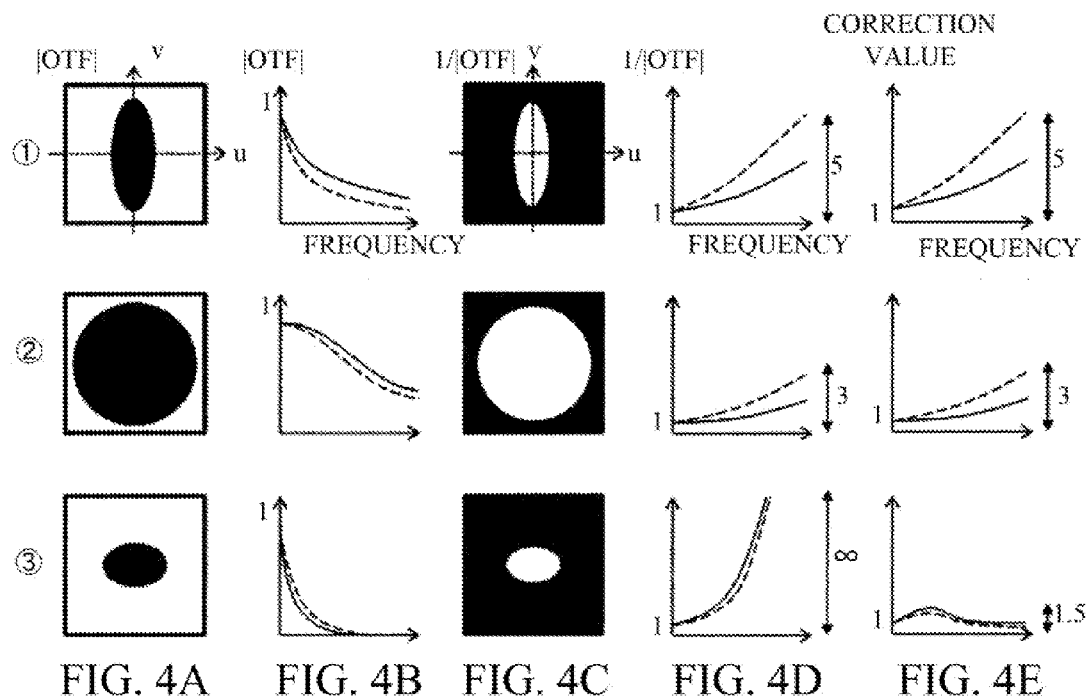
FIGS. 4A to 4E are diagrams illustrating one example of a method for calculating a restoration limit value based on the OTF data used in the image restoration processing in embodiment 2.

Each of circles 1 to 3 in FIG. 4A indicates a two-dimensional distribution |OTF(u, v)| of absolute values of three OTF having different image pickup conditions including the identification information and the image height of the image pickup optical system, and is also referred to as "MTF". An optical image acquired by the image pickup element is digitally sampled by the frequency band up to Nyquist frequency of the image pickup element. When the OTF(u, v) is derived by the calculation and is held to an optical characteristic data memory, the OTF(u, v) up to a cutoff frequency of an optical aerial image is obtained. When the OTF(u, v) information in the full band up to the optical cutoff frequency is held in the optical characteristic data memory, it is only necessary to notice the frequency band up to Nyquist frequency of the image pickup element.

A maximum correction effect obtained by the image restoration processing is that the OTF(u, v) becomes 1 over all frequency bands in Nyquist frequency. In other words, a correction value capable of obtaining the maximum correction effect is |1/OTF(u, v)|, and is an inverse value of |OTF(u, v)| illustrated in FIG. 4A in each frequency illustrated in FIG. 4C.

Each of circles 1 to 3 in FIG. 4B indicates one cross section of |OTF(u, v)| in FIG. 4A, and the solid line indicates |OTF(0, v)| and the broken line indicates |OTF(u, 0)|. Similarly, each of circles 1 to 3 in FIG. 4D indicates one cross section of |1/OTF(u, v)| in FIG. 4C, and the solid line indicates |1/OTF (0, v)| and the broken line indicates |1/OTF(u, 0)|. FIG. 4E illustrates one cross section on a u-v axis of a correction value corrected based on a limiting condition capable of controlling the inverse characteristic of |OTF(u, v)| and the correctable range. In reality, the maximum value of the correctable range on a two-dimension space of |OTF(u, v)| is calculated, but this embodiment is described using FIGS. 4B, 4D and 4E in order to keep the explanation as simple.

In the image pickup optical system having |OTF| as illustrated in each of the circles 1 to 3 in FIG. 4B, each of circles 1 to 3 in FIG. 4D indicates the frequency characteristic of the inverse characteristic of |OTF(u, v)|. In the circles 1 to 3 in FIG. 4D, the maximum values in frequency band of each image pickup element are respectively 5, 3 and ∞. At this time, when the value of |OTF(u, v)| takes 0 or near due to the frequency, the inverse characteristic diverges to an indefinite value or a large value, such an ∞. In this status, even if the correctable maximum value is made larger according to the inverse characteristic, the correction effect hard to be experienced because the correction effect is saturated. Further, a factor that deteriorates the image, such a significant amplification of the noise, and a ringing, is greatly caused. Therefore, a limiting condition is set so that the inverse characteristic of |OTF(u, v)| fails to be diverged, and hereinafter is referred to as "correctable range control condition". FIG. 4E illustrates a correctable maximum value that is determined based on the inverse characteristic of |OTF(u, v)| and the correctable range control condition. By setting the correctable maximum value or lower as the correctable range, a correction value specified by a user can be realized and the correction effect corresponding to this correction value can be experienced.

The correctable range control condition when the correctable maximum value is determined may be set as a so-called band limiting condition of, for example, establishing a limit of a correction amount of a predetermined frequency or more when an image restoration filter is designed. Moreover, in the Wiener filter as described in the expression (4) or an image restoration filter similar thereto, a specific frequency band may be weighted when the image restoration filter is designed to calculate the correctable maximum value. It is desirable to perform the above-mentioned method according to OTF in each color component of the image, but the calculation of one of R, G and B components among the color components may be used to reduce the correction time.

Figure 9:
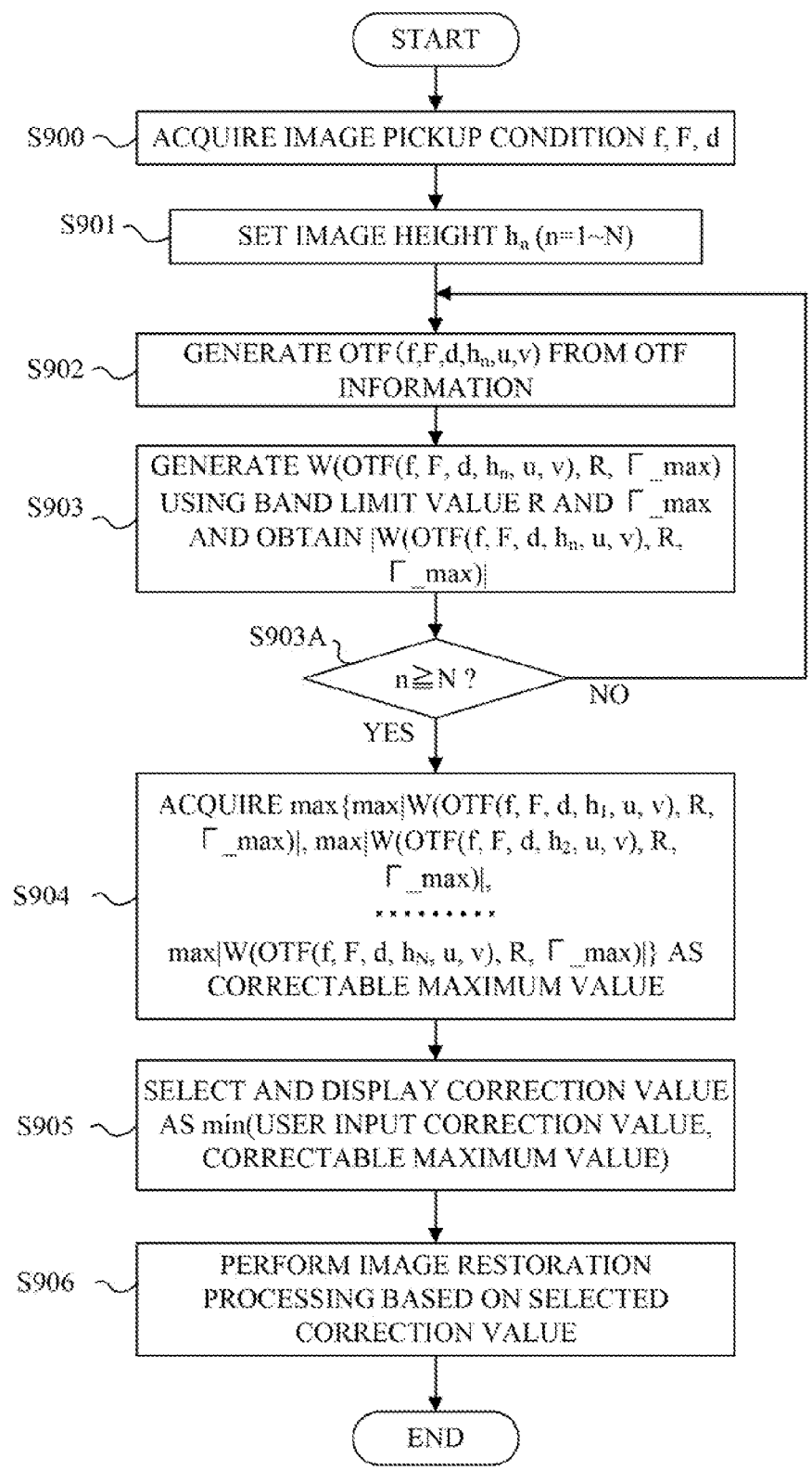
FIG. 9 is a diagram illustrating one example of a processing flow of the image restoration processing method in embodiment 2.

The image restoration filter is generated from the correctable maximum value and the OTF information which are calculated by the above-mentioned method, and the picked-up image is corrected. FIG. 9 illustrates a detailed procedure.

In step S900, the image processing apparatus acquires a focal length, an F-number, an image pickup distance information which are recorded along with the picked-up image data.

In step S901, the image processing apparatus sets N-image height positions on an image to generate the image restoration filter at the positions. It is preferable to set the image height position or the number of pieces N thereof so that an optical characteristic for the image height position on the image is smoothly changed. In particular, about N≥150 is preferable in a general image pickup optical system. When it is less than 150, the change between each image height in the optical characteristic increases, and the restoration accuracy decreases.

In step S902, the image processing apparatus generates OTF(f, F, d, h, u, v) from OTF information held in the memory with respect to the focal length, the F-number, the image pickup distance, which are acquired in step S900, and N-image height positions set in step S901.

In this embodiment, the Wiener filter is used as the image restoration filter. The Wiener filter is the image restoration filter which is represented in expression (4), and a correction paragraph Γ that suppresses the noise for the amplification of the frequency component in the image restoration.

When expression (4) is applied to OTF for various focal length: f, F-number: F, image pickup distance: d and image height: h and it is rewritten using band limit value: R, the following expression (6) is derived.

$$W(OTF(f, F, d, h, u, v), R, a) = 1/OTF(f, F, d, h, u, v)*|OTF(f, F, d, h, u, v)|^2/(|OTF(f, F, d, h, u, v)|^2 + \Gamma)*R + (1-R) \quad (6)$$

The following will be described by assuming the image pickup condition of the object image to execute the image restoration processing as focal length: f1, F-number: F1 and image pickup distance: d1.

In step S903, the image processing apparatus assigns f=f1, F=F1, d=d1 to expression (6), and obtains the image restoration filter that is represented in expression (7) shown below. In addition, focal length: f1, F-number: F1, image pickup distance: d1 and image height: h1 are arbitrary values that the image pickup optical system can be set. Moreover, band limit value: R may be an constant or a function of frequency (u, v).

$$W(OTF(f1, F1, d1, h1, u), R, \Gamma) = 1/OTF(f1, F1, d1, h1, u, v) * |OTF(f1, F1, d1, h1, u, v)|^2 / (|OTF(f1, F1, d1, h1, u, v)|^2 + \Gamma) * R + (1-R) \quad (7)$$

In step S903, the image processing apparatus, further, assigns Γmax for calculating the correctable maximum value to expression (7). In the Wiener filter, Γmax=0 and expression (7) is an inverse filter where a band is limited. In other words, Γmax is a value based on the inverse characteristic of the Wiener filter. In each image height position, a maximum value "max |W(OTF(f1, F1, d1, h1, u, v), R, Γmax=0)|" in a frequency space is obtained with respect to an absolute value "|W(OTF(f1, F1, d1, h1, u, v), R, Γmax=0)|" of the function where Γmax is assigned. This is the maximum value of the correctable range of the correction value.

Hereinafter, the maximum value of the correctable range of the correction value is referred to as "correctable maximum value". The Γmax, which is used for calculating the correctable maximum value, should be a value capable of obtaining the maximum of a theoretical max|W(OTF(f1, F1, d1, h1, u, v), R, Γmax=0)| in various image restoration filter, such a Wiener filter and a filter that is obtained by deforming the Wiener filter. In other words, a value 0 (zero) is used as Γmax in this embodiment without limitation.

In step S903A, the image processing apparatus determines whether the correctable maximum value of N-image heights set in step S901 was requested. The correctable maximum value is calculated in each image height position of the objection image in this embodiment, but the correctable maximum value may be acquired in a previously set specific image height without each image height.

In step S904, the image processing apparatus sets as the correctable maximum value a value where the correctable maximum value is largest in each image height. In addition, the correctable maximum value may be calculated from one arbitrary image height, or may use the maximum value among the calculation values calculated from all image heights.

In step S905, a correction value set by a user and the correctable maximum value are compared, and the smaller value is displayed on a display part. A specific example of the display will be described later.

In step S904, when the correctable maximum value is calculated only from one arbitrary image height, the correctable maximum value in one arbitrary image height is set in step S905 without the loop processing of S902 to S903. Further, when only the band limit or a notice in the design of the restoration filter is provided, there may be a case where the correctable maximum value is made too large according to the image pickup condition. In order to deal with this case, the correctable maximum value may be made as a table to be held in each image pickup condition.

In step S906, the image processing apparatus generates an image restoration filter using a correction value that is selected or set by a user via a controller from a correctable range displayed with a GUI. The image processing part convolutes a restoration object image and the image restoration filter using the corrected image restoration filter to generate a restoration image. Details of GUI will be described later.

In this embodiment, a method for providing a limitation in the frequency band, where the image restoration processing is performed, has been described, but the method for providing the limitation is not limited to the band limitation, but need not use, for example, the band limitation value: R. Alternatively, a value or a function of other terms may be changed so as to provide an effect similar to the limitation of the frequency band.

This embodiment has been described using the Wiener filter as the image restoration filter, but if the image restoration processing is performed using the inverse characteristic of OTF, it is not specially limited to the Wiener filter but may be changed variously. Accordingly, as described above, γmax is only for deriving the inverse filter W=1/OTF, and Γmax is not limited to the value 0 (zero).

Figure 5A:
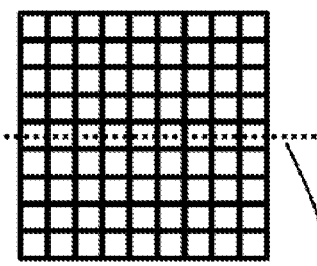
FIGS. 5A to 5B are diagrams illustrating one example of an image restoration filter in embodiment 2.
Figure 5B:
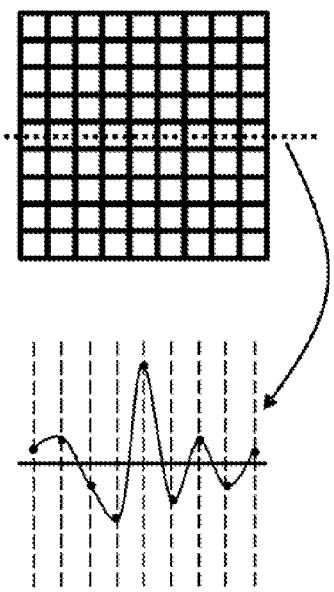

The image restoration filter is a two-dimension filter as illustrated in FIG. 5A, and has a shape as illustrated in FIG. 5B on a single axis along a broken line of FIG. 5A. Thus, the image restoration filter is different from a general edge emphasis filter or the like, and has a feature that the number of taps is large and the shape may be asymmetry.

[Embodiment 3]

As above, in the image restoration processing, a proper correctable range greatly changes in each combination of the image pickup condition. In other words, as an amount of aberration of an image pickup optical system and a deterioration of a picked-up image increase, the correctable range increases. In contrast, as the amount of aberration of the image pickup optical system and the deterioration of the picked-up image decrease, the correctable range decreases. Further, in the same image pickup optical system, the amount of aberration greatly changes in different image pickup condition and the correctable range also greatly changes. Therefore, it is important to provide a GUI where a user can simply decide the correction value according to the combination of the image pickup condition including the identification information of the image pickup optical system to perform the image restoration processing.

Figure 6A:
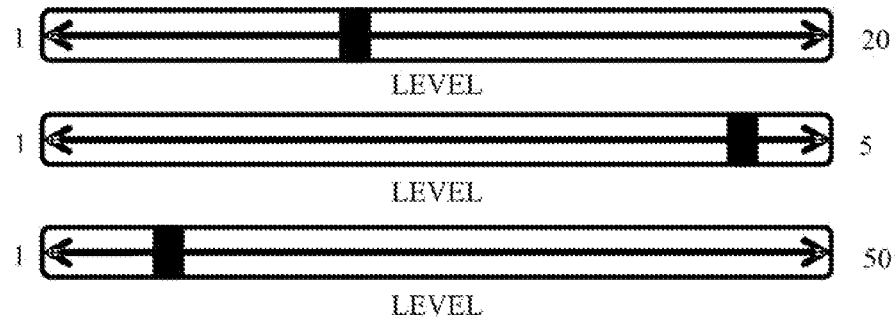
FIGS. 6A to 6B are diagrams illustrating one example of an image processing GUI in embodiment 3.
Figure 6B:
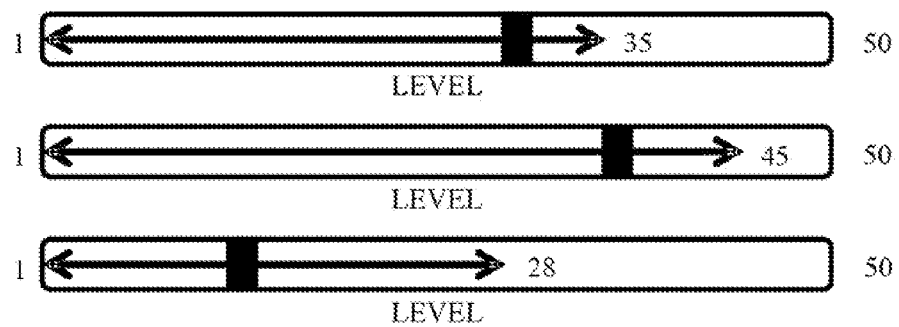

FIGS. 6A-6B are diagrams that illustrate one example of GUI (graphic user interface) to simplify the image restoration processing apparatus.

FIG. 6A defines the left end of GUI as 1 and the right end as a restoration limit value (correctable maximum value, settable maximum value) and illustrates the restoration limit value calculated from OTF, and a user determines the level of the restoration processing within a range of GUI from 1 to the restoration limit value. When such GUI is designed, the right end is automatically defined as the restoration limit value, and the set image restoration processing can be achieved regardless of the level of the restoration processing that is set by the user. FIG. 6B defines the left end of GUI as 1 and the right end as 50, and a user determines the level of the restoration processing within a range of the restoration limit value or less. The right end is 50 in GUI of FIG. 6B, but the user can set the level of the restoration processing within the range up to the restoration limit value. This embodiment has described a slider as one embodiment of GUI, but it may be changed to a spin control or the like.

[Embodiment 4]

Figure 7:
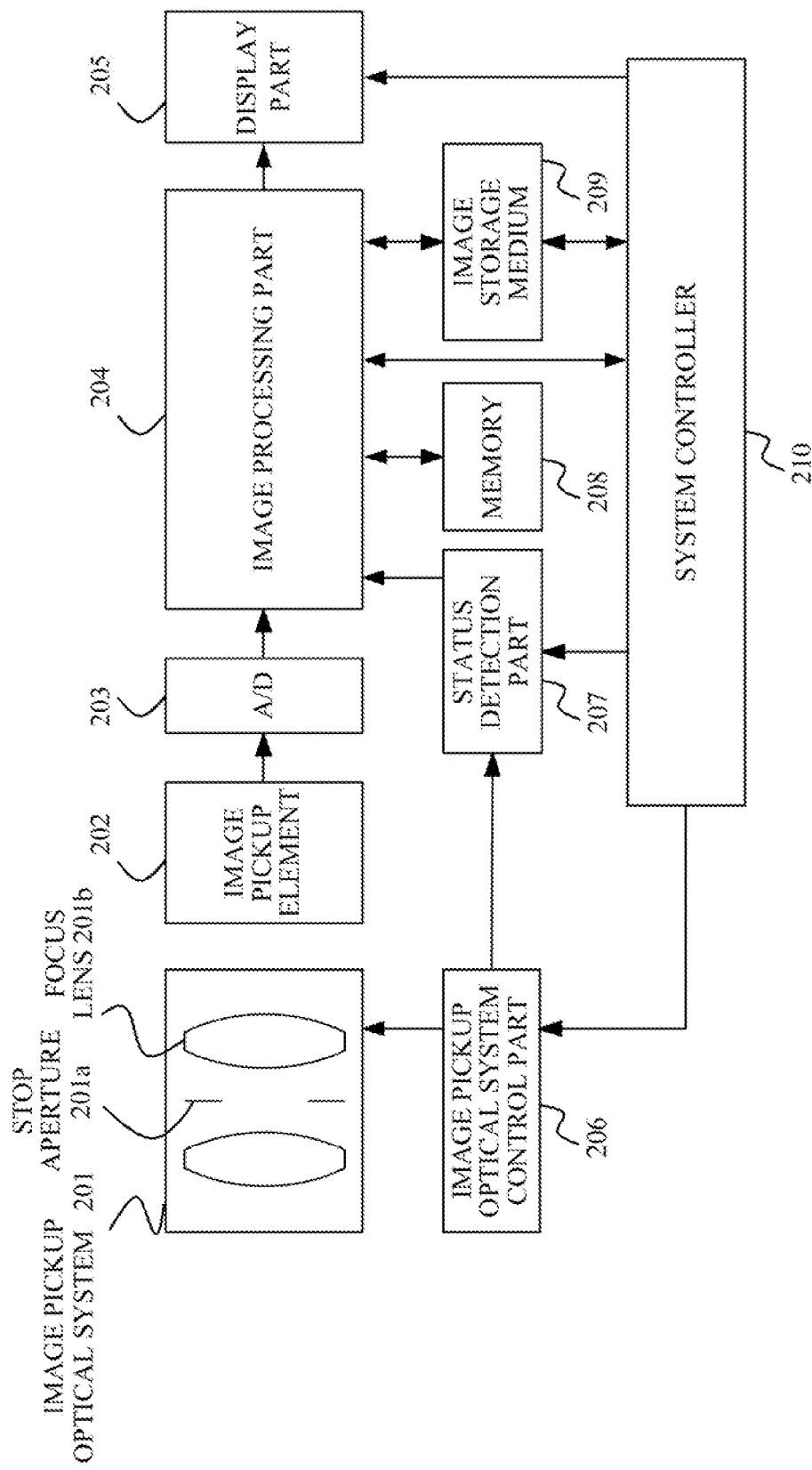
FIG. 7 is a diagram illustrating one example of an image pickup apparatus including an image processing apparatus in embodiment 4.

FIG. 7 illustrates an image pickup apparatus having built-in an image processing apparatus using the image processing method in the present invention, and it holds the identification information and the OTF information of the image pickup optical system 201 in the memory 208 in each combination of the image pickup condition, such a focal length, an F-number, an image pickup distance, an image height, a size of a pixel of an image pickup element. A stop aperture 201a, a focus lens 201b or the like is set in the image pickup optical system 201. The execution of the image processing including an image processing flow as illustrated in FIG. 1 by GUI etc. of the display 205 is determined.

When the determination is done, in the image pickup element 202 that picks up an optical image formed by the image pickup optical system 201, the picked-up image is obtained by converting the optical image into an electrical signal. At this time, in an image pickup optical system control part 206 or a status detection part 207, the image pickup condition, which includes the identification information of the image pickup optical system 201, the focal length when an image is picked-up, the F-number, the image pickup distance, the image height, the size of the pixel of the image pickup element, is acquired. A A/D convertor 203 converts, into a digital signal, an analog signal corresponding to an optical image output from the image pickup element 202. In an image processing part 204, a correctable range is determined based on the OTF information corresponding to the acquired image pickup condition.

In a display part 205, GUI for a user to determine a correction value from the determined correctable range is displayed. GUI is for displaying the correctable range illustrated in FIGS. 6A to 6B, the user determines the correction value within the correctable range. After the user determines the correction value in GUI, an image restoration filter is generated based on the correction value and the OTF information in the image processing part 204, the image restoration processing is done for the picked-up image, and the image after the image restoration processing is output.

An image storage medium 209 for storing the picked-up image including the image pickup condition information is connected to the image processing part 204. The OTF information corresponding to the image pickup condition when the picked-up image stored in the image storage medium 209 was picked-up is stored in the memory 208. A system controller 210 is configured with CPU, MPU or the like, and operates the control of the whole of the image pickup apparatus.

[Embodiment 5]

Figure 8:
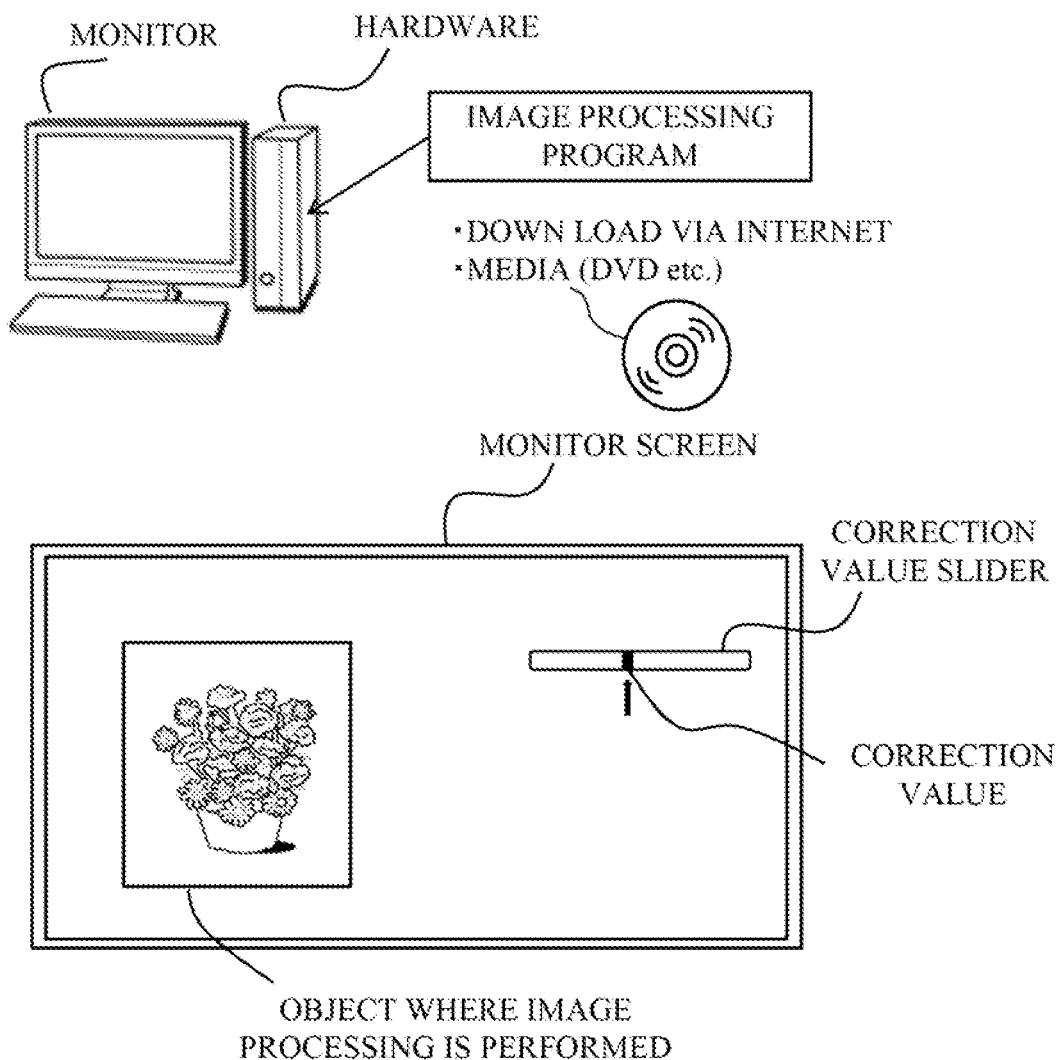
FIG. 8 is a diagram illustrating one example of an image processing program in embodiment 5.

A program that operates an image processing method of the present invention with a computer, such a personal computer, will be described with reference to FIG. 8. The program executes the image processing method for generating OTF information in each combination of a focal length, an F-number, an image pickup distance, an image height or the like, which are optical characteristic data of the image pickup optical system, and an image restoration filter using the OTF information. The OTF information can be acquired via a media, such a DVD in which the optical characteristic data is stored, or an internet.

The program of the present invention is an image processing program that executes the image processing flow illustrated in FIGS. 1 and 9. The following describes an execution procedure of the image processing program in this embodiment along FIG. 1. The personal computer is started, and the program is executed. The image processing is started using GUI on a display screen of a monitor or the like. A correctable range is determined using the picked-up image, the image pickup condition (identification information of an image pickup optical system, a focal length, an F-number, an image pickup distance, an image height, a pixel size of an image pickup element or the like) when the picked-up image is acquired, and OTF information corresponding to the image pickup condition. When the program starts the image processing, the correctable range is displayed using GUI illustrated in FIGS. 6A and 6B on a display via the personal computer. The user determines the correction value within the correctable range, the image restoration filter is generated based on the correction value and the OTF information, the image restoration processing is done for the picked-up image, and the image after the image restoration processing is output. The method for correcting the picked-up image is omitted because it has described in detail above.

[Other Embodiments]

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-183247, filed on Aug. 25, 2011 and No. 2011-250310, filed on Nov. 16, 2011 which are hereby incorporated by reference herein in their entirety.

What is claimed is:

1. A non-transitory computer-readable storage medium storing a process for causing a computer to execute a method, the method comprising the steps of:
    acquiring optical transfer function information corresponding to an image pickup condition of a picked-up image;
    generating a restoration image using correction optical transfer function information that is obtained by correcting the optical transfer function using a correction value; and
    setting a settable range of the correction value based on an inverse characteristic of the optical transfer function information.

2. The non-transitory computer-readable storage medium according to claim 1, wherein the setting step sets a maximum value of the settable range of the correction value.

3. The non-transitory computer-readable storage medium according to claim 2, wherein the setting step sets, as the maximum value of the settable range of the correction value, a value smaller than a maximum value of a settable range of a correction value before being set in the setting step.

4. The non-transitory computer-readable storage medium according to claim 1 that enables the computer to further execute the step of displaying the settable range of the correction value.

5. An image processing method comprising the steps of:
    acquiring optical transfer function information corresponding to an image pickup condition of a picked-up image;
    generating a restoration image using correction optical transfer function information that is obtained by correcting the optical transfer function using a correction value; and
    setting a settable range of the correction value based on an inverse characteristic of the optical transfer function information.

6. An image processing apparatus comprising:
    an acquiring unit configured to acquire optical transfer function information corresponding to an image pickup condition of a picked-up image;
    a restoration image generator configured to generate a restoration image using correction optical transfer function information that is obtained by correcting the optical transfer function using a correction value; and
    a setter configured to set a settable range of the correction value based on an inverse characteristic of the optical transfer function information.

7. An image pickup apparatus comprising:
    an image pickup element configured to pick up an optical image formed by an image pickup optical system;
    a memory configured to store optical transfer function information corresponding to an image pickup condition of a picked-up image; and
    an image processor configured to perform an image processing for the picked-up image obtained by the image pickup element,
    wherein the image processor acquires the optical transfer function information stored in the memory,
    generates a restoration image using correction optical transfer function information that is obtained by correcting the optical transfer function using a correction value, and
    sets a settable range of the correction value based on an inverse characteristic of the optical transfer function information.

8. The image pickup apparatus according to claim 7, further comprising an image pickup optical system.

* * * * *